Jan. 5, 1965  R. H. MURDOCK  3,164,354
STADIUM RAIL
Filed March 6, 1963  2 Sheets-Sheet 1
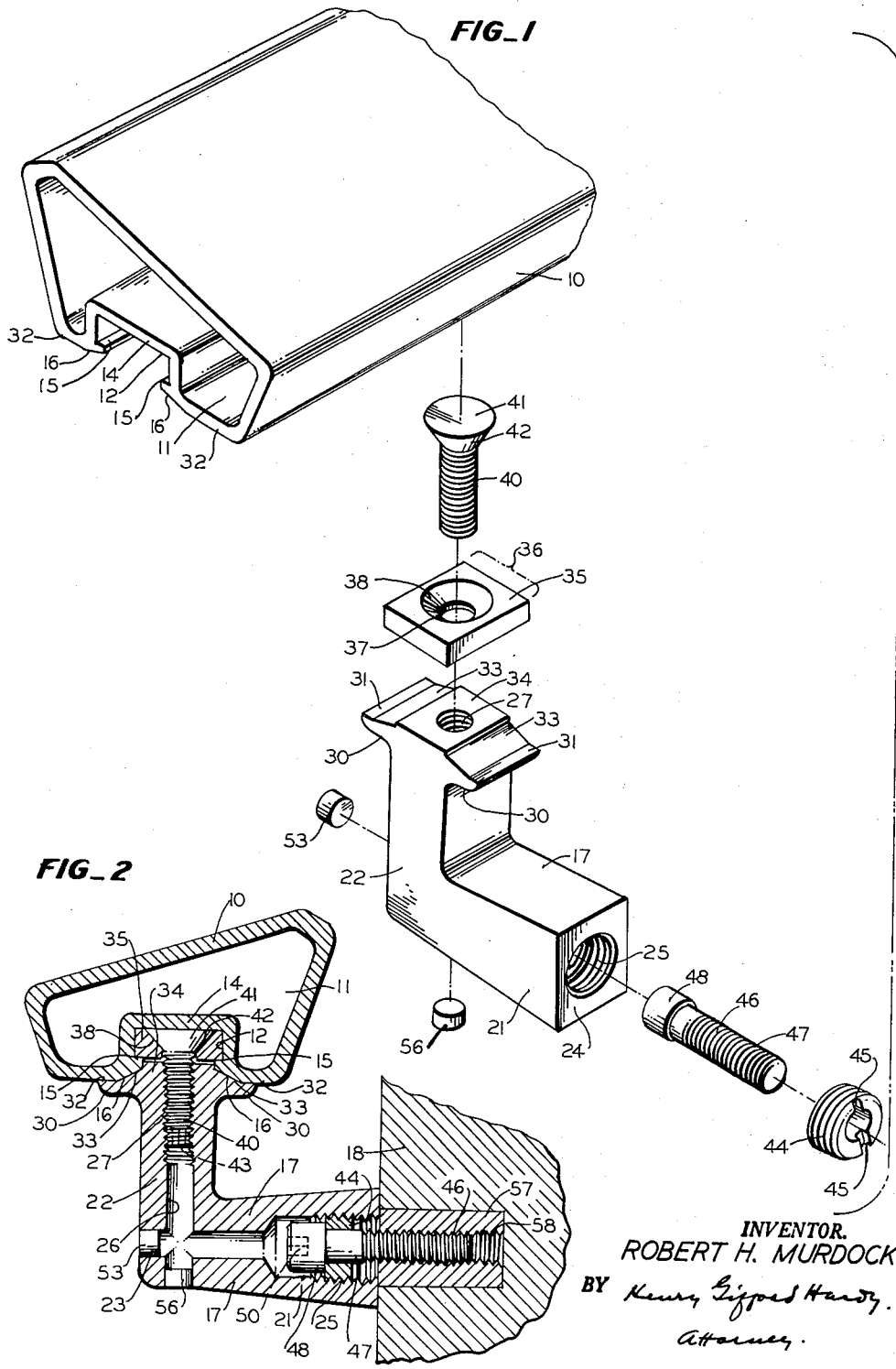
INVENTOR.
ROBERT H. MURDOCK
BY Henry Gifford Hardy
Attorney.

Jan. 5, 1965
R. H. MURDOCK
3,164,354
STADIUM RAIL
Filed March 6, 1963
2 Sheets-Sheet 2
FIG_3
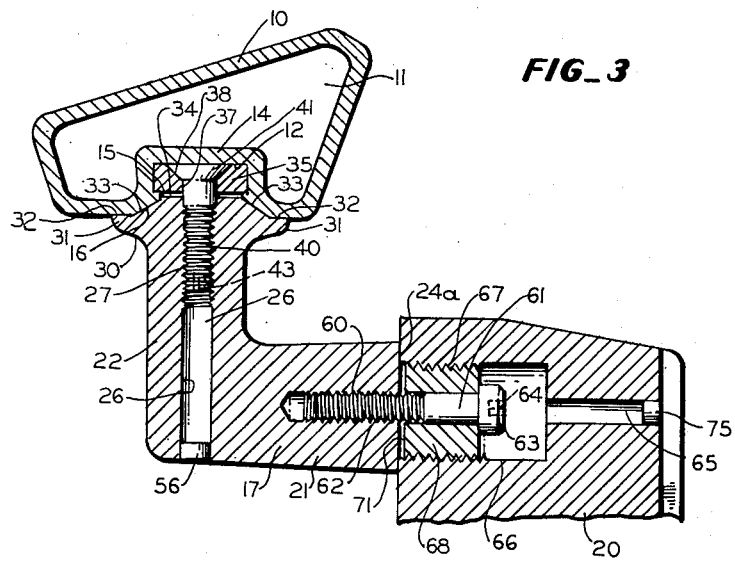
INVENTOR.
ROBERT H. MURDOCK
BY
attorney.

United States Patent Office 3,164,354
Patented Jan. 5, 1965

3,164,354
STADIUM RAIL
Robert H. Murdock, Kensington, Calif., assignor to American Metal Climax, Inc., a corporation of New York
Filed Mar. 6, 1963, Ser. No. 263,160
5 Claims. (Cl. 248—251)

This invention relates generally to a hand railing, and more specifically to a hand railing which is assembled from standardized extruded metallic components, primarily aluminum.

Recent technological advances in the metallurgical sciences have resulted in the increased use of strong, lightweight, and corrosion resistant metals, such as aluminum with or without anodizing, in the construction industry for many applications, such as railings, aluminum siding panels, or the like. The use of such metals in hand railings has become increasingly popular because the railings are not only extremely strong and durable, but are adaptable to be constructed in various eye-pleasing designs and may be further provided with various attractive, colorful and maintenance-free finishes, such as anodizing and porcelain enamel.

However, the past construction and assembly of such metal railings was a time-consuming and consequently expensive process due to the various operations, such as cutting, welding, fitting, polishing, etc., which were required at the point of installation to provide the quality of railing desired. A dangerous disadvantage inherent in prior railings was due to the manner of assembly thereof in which fasteners, such as bolt heads, screw heads, or the like, were exposed to cause injury to the fingers and hands of a person, especially small children, traversing the railing. Furthermore, such exposed fasteners rendered the railings susceptible to tampering, vandalism and public sabotage.

Accordingly, it is an object of the present invention to provide a metal hand rail and mounting bracket having a smooth, integral appearance and which is quickly and easily assembled, partially at the factory, without requiring the various operations of drilling, tapping, cutting, polishing, or welding at the point of installation.

It is another object of the present invention to provide a railing which is quickly assembled with no exposed fasteners to provide a smooth and uninterrupted railing surface of one alloy so that there will be no variation in finishes or color due to different underlying alloys or materials.

A further object of the present invention is to provide a railing comprising a series of longitudinally aligned and abutting rails having a hollow interior, providing splicing and corner connectors, for fastening the same together in abutting end-to-end relation, completely independently from or with the bracket holding means.

Another object of the present invention is to provide a railing wherein all cutting and drilling operations are performed during the manufacture of the various components thereof, thereby eliminating these operations by the purchaser of the materials.

It is a further object to provide a continuous railing which is virtually one piece thus providing a stronger railing, better protection from the weather and opportunities for failure and of uniform appearance.

It is a further object to provide a cooperating bracket for mounting the railing with no exposed fastening means which can be assembled and attached rapidly.

Another object of the invention is to provide a bracket which includes inside-out bolts which provide not only fully concealed fastening means and speed of assembly, but greatly reduces any possibility of snagging, vandalism or failure.

Further objects are to provide a construction of maximum simplicity, economy and ease of assembly and disassembly, also such further objects, advantages and capabilities as will fully appear and as are inherently possessed by the device and invention described herein.

The invention further resides in the combination, construction and arrangement of parts illustrated in the accompanying drawings, and while there is shown therein a preferred embodiment thereof, it is to be understood that the same is illustrative of the invention and that the invention is capable of modification and change and comprehends other details of construction without departing from the spirit thereof or the scope of the appended claims.

In the drawings:

FIGURE 1 is an exploded perspective view showing a portion of the handrail extrusion and the bracket assembly for securing the same in position;

FIGURE 2 is a vertical section showing the handrail and bracket secured to a wall; and FIGURE 3 is a vertical sectional view similar to FIGURE 2 but with the handrail and bracket secured to a post.

Referring now to the drawings in which like reference numerals refer to like parts in the several views, the handrail 10 is a single piece of extruded metal having a hollow cavity 11 which is completely without communication to the outside except at the ends of the extruded sections. This has many advantages not the least of which are that it is a stronger railing section, offers better protection from the ravages of weather, exposure to moisture and opportunities for failure. On the bottom side of the extrusion is a separate T-shaped channel 12, the top portion 14 of which is designed to be in a horizontal plane. The T-shaped channel or slot 12 is closed at the top and the sides but open at the bottom with opposed right angle shoulders 15 projecting inwardly. Below the shoulders the portions 16 of the extrusion are angled downwardly and outwardly, and from this point on the railing extrusion 10 may assume any desired shape. One of the important features is that so long as the extrusion has the T-shaped channel 12 and is separated from the inner cavity 11 of the rail, the rail itself may be made in any desired shape to meet the fancy of the user. The rails being extruded from a metal alloy such as aluminum, provide a strong and integral rail having a smooth outer surface which is free of any snagging portions and is capable of accepting almost any type of finish, particularly anodized finishes.

The railing is secured to a surface such as a wall or to a post by means of brackets 17 and for purposes of illustration, in FIGURE 2 the bracket is shown secured to a wall 18 and in FIGURE 3 the bracket is secured to a post 20. The bracket 17 which is L-shaped has a substantially horizontal leg portion 21 and a vertical leg portion 22. From the outermost surface beyond the juncture between leg portions 21 and 22, there is a horizontal bore 23 which extends completely through the horizontal leg portion 21. From the inside surface or abutting face 24 of the leg portion 21, the bore 23 is counterbored with a larger diameter and threaded internally as at 25 for a portion of its distance. Starting at the base of the bracket 17 it is bored vertically with bore 26 completely through the vertical leg member 22 and threaded from the top thereof downwardly for substantially half of its distance as at 27. The leg 22 of the bracket 17 terminates adjacent its top with outwardly flaring flanges 30. The flanges 30 extend outwardly so that the tips 31 rest against the outer flat contour 32 of the extruded railing. Inwardly from the tips 31 are upwardly sloping portions 33 which slope at the same angle and conform with the angles 16 of the extrusion. The bracket terminates with a land 34 which is of an appropriate width so that it is exactly received within the opposed flanges 15 of the extrusion. The land 34 is high enough so that it approximates the height of the flanges 15 in the T-shaped channel or groove 12 but does not extend above them. The member 35 is rectangular in shape having a width 36 just wide enough to be slidably received within the inner rectangular portion of the T-shaped groove 12 being inserted therein by the shouldered flanges 15. The member 35 is bored at 37 and countersunk from the top as at 38. A novel inside-out screw 40 having a flat head 41 with a taper 42 to be received within the countersinking 38 so that the flat head 41 is approximately flush with the top surface but not higher. The threads of the screw 40 engage in and are received by the threads 27 of the vertical bore 26. On the inner end of the screw 40 is a hexagonal axial recess 43 to receive a standard size Allen wrench.

With reference to FIGURES 1 and 2, in the threaded portion 25 of the enlarged bore in the horizontal leg 24, there is a steel insert 44 which is threaded externally with lefthand threads to conform with the lefthand threads 25. The insert 44 is bored axially and has diametrically opposed radial slots 45 to receive the prongs of a spanner wrench. The threaded shank 46 of the cap screw 47 passes through the axial opening of the insert 44. The head 48 of the cap screw 47 is received in the interior of the counterboring mostly within the unthreaded zone. The head 48 has an axial hexagonal recess 50 to receive a standard size Allen wrench. Plugs 53 and 56 may be driven into the entrance openings of the bores 23 and 26 respectively, to seal off access to screws 40 and 47 when tightened in position, although this is not essential.

Operation

One of the distinct advantages of the handrail described herein is that all of the assembly prior to the actual installation can be made at the shop under the best conditions, and there is no need to ship numerous small parts for assembly on the job. In assembling the bracket, the screw 41 is inserted through the member 35 and thence seated in the threads 27 of the bore 26. An Allen wrench is inserted through the bore 26 from the bottom to engage the socket 43 to turn the screw 40 nearly all of the way to the tight position. Next, the screw 47 is inserted through the axial hole in the insert member 44 and this assembly is inserted in the large bore on the inner surface 24 of the bracket with the head of the screw 48 first. When the lefthand threads of the member 44 engage the threads 25 in the bracket which are also lefthand threads, a spanner wrench is used to turn the member 45 into position without turning it up tightly but only so that it is well within the threaded bore 25. It will be observed that the screw 46 is retained within the bracket and turns loosely in the insert member 44 and that the screw 40 holds the member 35 in position on the upper leg 22 of the bracket.

Since rail lengths are pre-cut and since the precise number of brackets required for any one length of rail is known from the architect's drawings, the brackets are inserted on each rail length by sliding in the member 35 in the manner shown in FIGURE 2 in the T-shaped slot 12 so that the member 35 is retained therein in all respects and is capable only of longitudinal movement. For purposes of tightening the same on the rail, an Allen wrench can be inserted into the socket 43 of the screw 40 and the bracket tightened in position. When the rail has been delivered to the site of installation the wall 18 has been prepared by a suitable insert 57 which is threaded at 58 to receive the threads 47 of the screw 46. The screw 40 is then loosened slightly to permit sliding adjustment of the rail and the screw 46 is turned into position on the location by inserting the Allen wrench into the socket 50. In the tightening process of the screw 46 there may be some rotation of the member 44. However, since this has lefthand threads, any rotation will be to merely tighten the structure rather than loosen it. When the bracket 17 is in proper position, then the screw 46 is turned up tight by the Allen wrench so that the face 24 of the bracket abuts the face of the wall 18 in tight and non-movable engagement. When the brackets 17 are in place along the wall, the handrail 10 is moved on the members 35 to the proper position and when this is attained, the screw 40 is tightened so that the member 35 clamps the flanges 15 against the sloping faces 33 of the bracket. This insures a tight gripping of the handrail so that it will not move from its adjusted position.

It will be observed that in installing a bracket of this kind it can be done in very short order and that once installed, the handrail is in rigid position firmly and strongly with concealed and non-protruding screws and bolts. There is nothing whatever to catch or snag flesh or clothing and the attachments are concealed so that they are practically tamper-proof. If it is desired, plugs 53 and 56 can be inserted in the outer ends of the bores 23 and 26 as shown in FIGURE 2 to completely seal the access to the tightening or loosening means.

With reference to FIGURE 3, there is shown a variant form in which the bracket 17 is attached to post 20. The construction of the vertical portion of the L-shaped bracket 17 is identical with that shown in the other views. However, the bore 60 extends inwardly only from the inner face 24a of the bracket and is not counterbored. It is threaded internally to receive the threads 62 of the cap screw 61. The head 63 of the cap screw 61 contains an axial hexagonal recess 64 to receive the standard Allen wrench. The attachment of the bracket 17 to the post 20 permits access from the opposite side to the face 24a of the bracket. Accordingly, the post is drilled laterally as at 65 and counterbored from the attaching side with a larger diameter which is internally threaded as at 67. Here again the threads 67 are lefthand threads and are received within the threaded recesses of the counterbore. Also the insert member 68 is axially bored so that the cap screw 61 may pass therethrough. The insert member 68 is provided with radially extended slots 71 for the reception of the prongs of a spanner wrench.

In this instance each post is delivered to the work site with the insert member 68 turned into nearly tight position and with the cap screw 61 projecting therethrough in the manner shown in FIGURE 3. The bracket 17 comes with the screw 40 and the locking member 35 in position as before described. When the bracket is to be positioned, the threads of the cap screw 61 engage the threads 62 in the lateral bore and are turned up tight by inserting an Allen wrench from the opposite side through the lateral bore 65 of the post and engaging the socket 64. As the cap screw 61 is turned up tight any rotation of the member 68 will also turn up tightly because of the lefthand threads. While the fastening means are concealed and practically tamper-proof, nevertheless, it may be desirable to plug the bore 65 with the plug 75 heretofore described.

It will be observed from the several figures of the drawings that the hollow cavity 11 provides space for a conforming internal splicing insert or a corner connector, for securing the abutting ends together, which is wholly independent of the T-shaped channel 12. Not only does this permit the attaching of the bracket at any place along the T-shaped channel without interference of any type of splicing insert, but it allows the channel 12 to receive vertical panels or bars independently of and without consideration to the location of the splicing of abutting rails. This is extremely important in the rapid and economic handling and installation of the rail.

I claim:

1. An L-shaped bracket assembly for attaching a handrail to a support surface comprising an L-shaped member having contiguous vertical and horizontal legs, through bores axially of each of said legs, a clamping member for slidable retention within a non-communicating flanged channel of a handrail, concealed screw means within the bore of said vertical leg for securing said clamping member in position within the rail channel with respect to said leg and concealed screw means within said bore of the horizontal leg for securing said horizontal leg to a supporting surface.

2. The bracket of claim 1 wherein the concealed screw means has means for engaging a tightening tool at its internal end.

3. Means for attaching a handrail to a supporting surface, in combination a handrail having a continuous longitudinal flanged groove, a clamping member slidably mounted and retained within said groove, an L-shaped member having contiguous vertical and horizontal legs, a through bore axially of said vertical leg, concealed screw means within the bore of said vertical leg cooperating with said clamping member for clamping the flanges of said handrail between it and the vertical leg, a longitudinal bore axially of said horizontal leg, concealed screw means within said longitudinal bore for securing said horizontal leg to a supporting surface, each of said concealed screw means having means on their respective ends to engage a tightening tool.

4. Means for attaching a handrail to a supporting surface, in combination a handrail having a continuous longitudinal flanged groove, the outer faces of said flanges being shaped with the rail, a clamping member slidably mounted and retained within said groove, an L-shaped member having contiguous vertical and horizontal legs, said vertical leg having its top abutting surface shaped in complement to said formed rail surface and rail flanges and extended to form a support therefor, a through bore axially of said vertical leg, concealed screw means within the bore of said vertical leg cooperating with said clamping member for clamping the flanges of said handrail between it and the vertical leg, a longitudinal bore axially of said horizontal leg, and concealed screw means within said longitudinal bore for securing said horizontal leg to a supporting surface, each of said concealed screw means having means on their respective ends to engage a tightening tool.

5. An L-shaped bracket assembly for attaching a handrail to a supporting surface comprising an L-shaped member having contiguous vertical and horizontal legs, a through bore axially in said vertical leg, a longitudinal bore in said horizontal leg opening at least through the free end thereof, the vertical bore being internally threaded a portion of the distance from the top, the horizontal leg being counter bored with a larger diameter and internally threaded with lefthand threads, a clamping member, a flush head screw having means for engaging a tightening tool at its internal end, said screw engaging in the threaded portion of the vertical leg to hold said clamping member thereto, a lefthand threaded insert in the counterbore of said horizontal leg and a cap screw passing axially through said insert, each of said screws having means at one of their ends for engagement of a tightening tool for securing the bracket to a supporting surface and to the rail.

References Cited by the Examiner

UNITED STATES PATENTS

| | | | |
|---|---|---|---|
| 126,630 | 5/72 | Gilbert | 20—92 |
| 1,698,139 | 1/29 | McElroy | 29—150 |
| 2,903,223 | 9/59 | De Gray | 248—221 |
| 2,914,284 | 11/59 | Tisdall | 248—251 X |
| 3,007,678 | 11/61 | Buehler | 256—65 |
| 3,026,080 | 3/62 | Thurnauer | 248—251 |
| 3,065,523 | 11/62 | Sloyan | 29—150 |
| 3,068,969 | 12/62 | Van Kerschauer | 189—36 |
| 3,071,350 | 1/63 | Opie | 256—65 |
| 3,076,636 | 2/63 | Blum | 256—67 |

FOREIGN PATENTS 583,340  9/59  Canada.

FRANK L. ABBOTT, *Primary Examiner.*